Feb. 16, 1932.  T. G. SCHOOLCRAFT  1,845,889
OIL WELL DEVICE
Filed Jan. 19, 1931    2 Sheets-Sheet 2
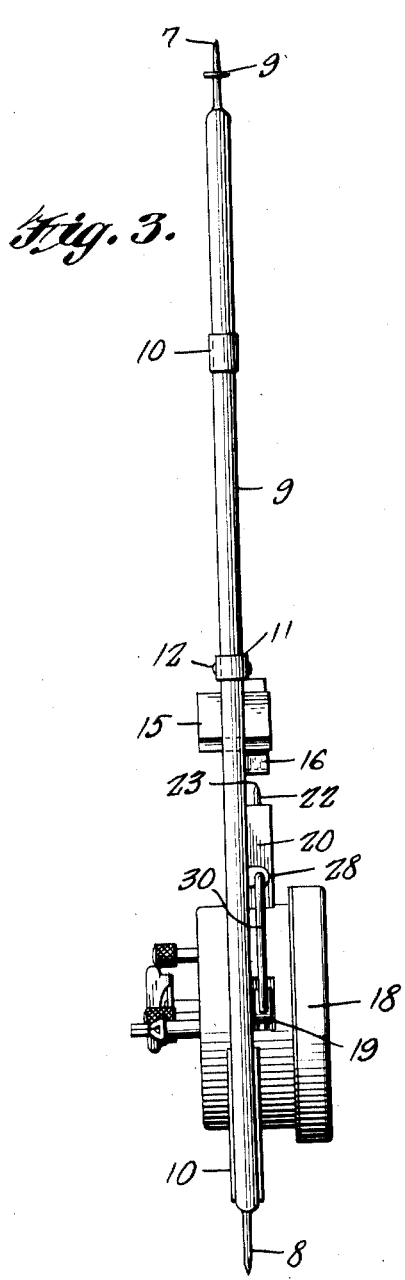
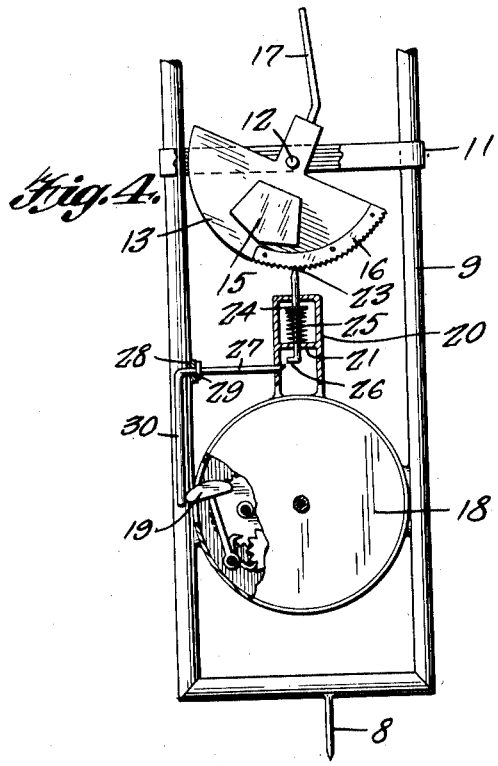
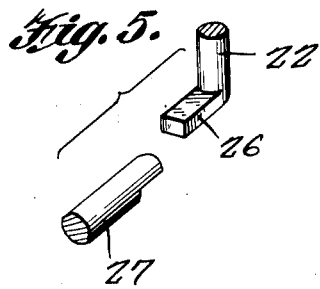
Thomas G. Schoolcraft,
INVENTOR Patented Feb. 16, 1932

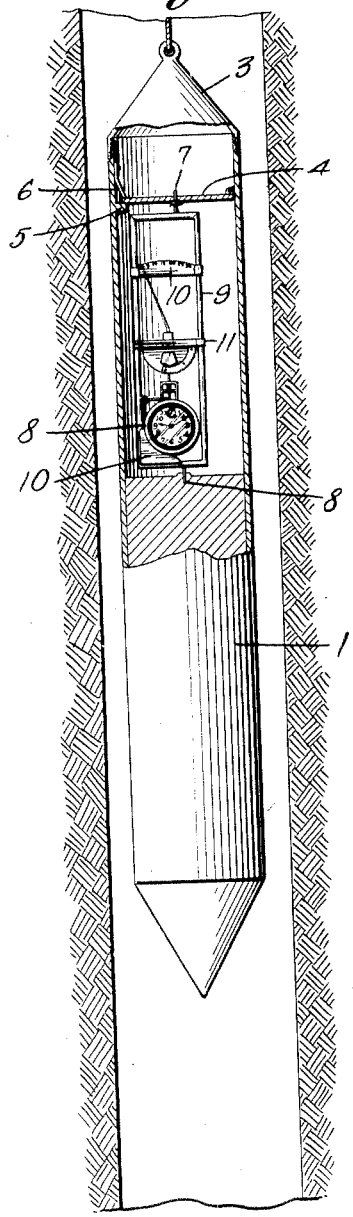
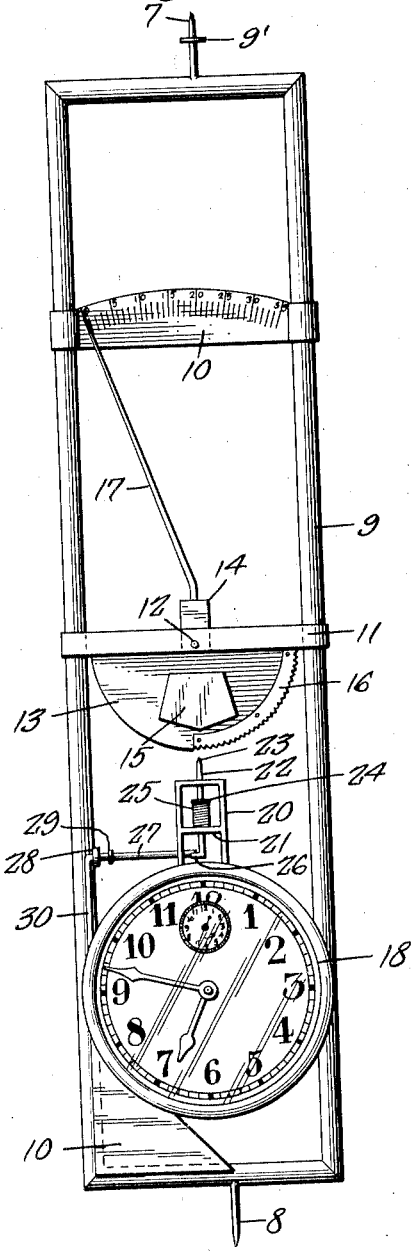

1,845,889

UNITED STATES PATENT OFFICE

THOMAS G. SCHOOLCRAFT, OF OKOTOKS, ALBERTA, CANADA

OIL WELL DEVICE

Application filed January 19, 1931. Serial No. 509,760.

My present invention has reference to an instrument for registering the degree from the perpendicular of an oil well or other drilled hole to enable the driller to check such variations and thereby avoid mishaps which occur from crooked holes, such as twistoffs which result in unsatisfactory fishing jobs, the running of casing in a crooked hole which causes the casing to cave in, the wear on line wires, sucker rods and pumping equipment.

The object of the invention is the provision of a simple instrument for this purpose which will accurately indicate the degree from the perpendicular of an oil well, but not the direction in which the hole is drilled and which instrument requires no special tools in the operation thereof, employs no wearing parts and which is rugged to withstand the hard usage to which it is subjected without damage to the instrument.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of the improvement with parts broken away and parts in section.

Figure 2 is a face view of the frame of the improvement and the elements carried thereby.

Figure 3 is an end view thereof.

Figure 4 is a detail rear elevation looking toward the bottom of the frame with a part of the clock casing broken away and showing the toothed segment locked.

Figure 5 is a perspective view of the cooperating ends of the segment holding finger and release element for such finger.

The improvement is designed for daily use by the driller to check variations in a hole or well from the perpendicular. By such daily use the driller can accurately ascertain the condition of the hole and avoid mishaps which occur from crooked holes. By such daily employment of the instrument a straight hole can be bored.

The improvement includes a shell 1, which is in the nature of a plumb bob, the same being of cylindrical formation, having both of its ends pointed and having its lower portion filled to weight the same. The upper wall provided by the filling is indicated by the numeral 2 of the drawings and the upper end of the shell is removable and is indicated for distinction by the numeral 3, and to this end 3 the sand or other line is attached. The shell 1, below the cap end 2, has hingedly secured therein a plate 4 designed, when swung to horizontal position, to be contacted by a stop element 5 and to be engaged by a spring latch 6.

The swingable plate 4 and the wall or shoulder 2 are provided with alining round openings for the reception of trunnions 7 and 8 on the ends of the substantially rectangular frame 9. Both of the trunnions have pointed ends and the trunnion 7 has a flanged or shouldered portion 9 to be contacted by the under face of the swingable plate 4 when the latter is swung to closed and latched position. The trunnions 7 and 8 are arranged a slight distance from the longitudinal center of the frame 9 and one of the lower corners of the frame has arranged therein a weight 10. This permits the lower sides of the frame swinging independently of any movement of the shell 1. It should be here stated that the shell 1 is moisture proof and that all of the parts of the instrument except, perhaps, certain parts of the clock hereinafter to be described, are of brass or of other non-magnetic metal so that the device is immune to any magnetic properties which might be found in the formations of the hole in which the survey is being made. Also the instrument is of any desired size and may be of a different shape than that described. The gage needle hereinafter alluded to with particularity may be also of different lengths and gages made in proportion to the length of the needles can be furnished with each instrument so that the operator can use any desired needle and gage according to the condition of the hole and the closeness to which he wishes to check. The frame 9 may be in the nature of a tube, and the side members thereof, at a point suitably spaced from the top, have secured thereon the ends of a degree gage 10. By reference to Figure 2 of the drawings it will be noted that the degree marks on the scale 10 read from the left to the right hand side of the said scale. Below the scale 10 the frame has secured to the sides thereof plates 11 and between these plates there is centrally pivoted, as at 12, a segment 13. The segment is provided with a projecting finger 14 through which the pivot 12 passes, and the segment 13 is centrally provided with an opening for a weight 15. The weight acts as a plumb bob and always maintains the finger 14 in a perpendicular position regardless of the tilt or leaning of the frame. One face of the segment, in a line with the rounded edge or periphery thereof, has secured thereon a toothed rack 16 and the teeth of the rack are spaced to correspond with the distance between the degree graduations of the scale 10. The rack is arranged diagonally opposite and has one end to contact with one of the plates 11 and thus holds the segment 13 from swinging except in one direction. The degree marks on the scale are closely related and over the scale there is designed to travel the gage needle 17, angularly arranged with respect to the frame but which has a straight end that is fixed at the center of the finger 14. The degree gage is graduated in degrees according to the distance it is placed from the center of the swinging arc or segment 13 where the said segment is suspended from its shaft or pivot 12. The closer the degree gage is placed to the swinging arc or segment means that a hole that is possibly 40° from the perpendicular can be surveyed or rather registered with accuracy although the degree marking on the degree gage will be close together. The farther away from the center of the swinging arc that the degree gage is placed means that the marking on the degree gage will be further apart and, therefore, a reading can be accurately made to within a fraction of one degree. By bending the gage needle 17, or arranging the same at an angle with respect to the weighted segment 13, permits of the gage being read from one side of the frame to the other instead of only from the center of the frame to one side. This is an advantage because it permits the reading of a degree gage at a greater distance from the center of the swinging segment and thus obtains a closer survey because of the greater distance between the degree gage markings.

Supported in the frame 1, below the swinging arc or segment 13 there is a clock casing 18 of the ordinary construction and containing therein the usual spring wound train of gears for turning the hands and the train of gears for operating the hammer or tappet 19 of the alarm mechanism. The alarm is, of course, set in the usual manner. The clock frame 18 supports at the top thereof a guide in the nature of a substantially inverted U-shaped member 20 whose vertical and parallel arms are connected by a brace element 21. Movable through a central opening in the top and an alining opening in the part 21 there is the locking element for the weighted segment 13. The element is in the nature of a rod 22 that has a pointed outer end 23 to engage between the teeth of the rack 16. The rod has a stop element 24 thereon to contact the outer end of the member 20 and limit the longitudinal movement of the said rod through the said member 20. Around the rod, and contacting with the part 21 and stop 24 there is a pull pressure spring 25 and the lower or inner end of the rod is bent angularly or otherwise formed with a lug 26. This lug, when the locking element 22 is in normal retracted position is engaged by the flat end of a rod or like member 27, movable through a guide eye 28 on one side of the frame and is provided with a stop element 29 for limiting the outward longitudinal movement of the said rod. The rod has a depending arm 30, and this arm is in the path of contact with the hammer 19 of the alarm mechanism of the clock. The arm 30 and the rod 27 provide the trip of the improvement.

The operation of the device may be briefly described as follows: We will say that the clock is set to strike at half past nine, as shown in Figure 2 of the drawings and the alarm mechanism is set to strike at 9.30. The locking rod or pin 22 is depressed and held by the trip which allows the swinging of the weighted arc or segment 13 and the needle 17. The device is then placed in the shell, the cap screwed on the shell and the instrument lowered into the well. We will allow twenty minutes for this operation, although we only take 15 minutes. We are thus sure that the device is in position and has time to become quiet. By timing ourselves on the derrick floor we can tell when to pull the instrument out. Figure 4 illustrates the trip mechanism thrown by the clock hammer 19 and the locking rod or pin 22 released and influenced by a spring 25 to engage between two of the teeth of the rack 16 on the weighted arc or segment 13. The gage needle points to we will say fourteen degrees which means that the hole was that many degrees from perpendicular at the depth the survey was taken. The manner in which the frame is inserted in and removed from the shell will, it is thought, be apparent, it being merely necessary to unscrew the top 3, unlatch the plate 4, swing the same to along the side of the shell 1 and remove the frame 9, and the frame is inserted in the shell by reversing this operation. The frame cannot jump out of place and the device can be stood upside down or laid flat without effecting the mechanism or causing any part thereof to become jammed. No jar received with ordinary treatment or the lowering of the instrument in the well will cause the operation of the trip. With the improvement there is only one element to consider that is, time. The device is very simple and easy to operate as no experience is required in such operation than that of setting the alarm clock. No special tools are necessary with the improvement and all of the parts constituting the same are associated in a manner that will not permit the same becoming loosened or separated which is an important feature around a well rig. The device can be run on the sand line or on a small line of its own and is run in the same manner as all present straight hole devices are run.

With the instrument it will be apparent that accurate gage readings can be obtained and if a permanent record is required copies of the degree gage can be made with date, depth, well number, lease, etc., and the reading can be transferred to the degree gage copy for filing and future reference.

Having described the invention, I claim:

1. An apparatus for the described purpose, comprising a weighted shell to be lowered in a well, a degree scale in the shell, a centrally weighted pivotally supported segment having a gage finger to travel over the scale, a normally inoperative spring influenced lock to hold the segment from swinging, a slidable trip for normally holding the lock in inactive position, and a chronometer carried by the frame and carrying means for releasing the trip at a set period.

2. An apparatus for the described purpose, comprising a weighted shell to be lowered in a well, a frame pivotally mounted in the shell, a centrally weighted pivotally supported segment on the frame carrying an angle gage finger to travel over the scale when the shell is canted, a spring influenced lock to engage with the segment to hold the same from swinging, a slidable trip for holding the lock out of engagement with the segment, a chronometer carried by the frame, and having an element operable by the works thereof to engage with and move the trip out of engagement with the lock at a set period of time.

3. An apparatus for the described purpose, comprising a weighted shell to be lowered in a well, a frame pivotally mounted in the shell, a centrally weighted pivotally supported segment on the frame carrying an angle gage finger, a degree scale on the frame over which the finger travels when the shell is canted, means for preventing the swinging of the segment in one direction.

4. An apparatus for the described purpose comprising a weighted shell to be lowered in a well, a frame pivotally supported off of its center in the shell and said frame having one of its lower corners weighted, a degree scale carried by the frame, a centrally weighted segment pivoted in the frame and carrying an angle needle to travel over the scale, a spring influenced lock to engage with the segment to hold the same from swinging, a slidable trip to engage with the lock to hold the same away from the segment, a chronometer carried by the frame and having an element operated by the works thereof for contacting with the trip to bring the same out of engagement with the lock at a set period of time.

5. An instrument for the described purpose, comprising a weighted shell to be lowered in a well, a frame pivotally supported off of its center in the shell, a degree scale on the frame, a pivotally supported weighted segment in the frame carrying an angle gage needle to travel over the scale, a quadrantal rack on the periphery of the segment, engaging with an element on the frame for preventing the swinging of the segment except in one direction, a spring influenced lock to engage with the teeth of the rack, means for limiting the movement of the lock in the direction of the rack, a slidable trip to engage with the lock to hold the same away from the rack, means for limiting the sliding of the trip, an alarm clock fixedly supported in the frame and having the hammer of its alarm mechanism in the path of contact with the trip and designed to engage with the trip to release the lock at a set period of time.

6. An instrument for the described purpose comprising an elongated shell having upper and lower pointed ends and having a weight in the lower portion thereof and its upper end removable, a hinged plate in the shell, latching means for holding the plate transversely in the shell, an elongated frame having trunnions off the center at the ends thereof to be received in the shell, stop elements on the trunnions, a degree scale carried by the frame, a pivotally supported centrally weighted segment in the frame having an angle needle to travel over the scale when the segment is swung, a quadrantal toothed rack on one face of the segment at the periphery thereof, an element on the frame engaged by one end of the rack for holding the segment from swinging except in one direction, a spring influenced locking pin to engage with the teeth of the segment, stop means for limiting the movement of the lock pin, a slidable trip to engage with the lock pin for holding the same away from the rack, an alarm clock supported in the frame having its alarm operating hammer in the path of contact with the trip and designed to engage therewith at a set period of time to release the lock pin, and said frame having its lower corner, diagonally opposite the rack on the segment weighted.

In testimony whereof I affix my signature.

THOMAS G. SCHOOLCRAFT.